United States Patent
Brown

(10) Patent No.: US 8,339,077 B2
(45) Date of Patent: Dec. 25, 2012

(54) SLOW SPEED OPERATION OF BRUSHLESS DIRECT CURRENT MOTORS BY GATING PULSE WIDTH MODULATION DRIVE

(75) Inventor: Ward R. Brown, Chandler, AZ (US)

(73) Assignee: Microchip Technology Incorporated, Chandler, AZ (US)

( * ) Notice: Subject to any disclaimer, the term of this patent is extended or adjusted under 35 U.S.C. 154(b) by 444 days.

(21) Appl. No.: 12/767,017

(22) Filed: Apr. 26, 2010

(65) Prior Publication Data

US 2011/0084635 A1    Apr. 14, 2011

Related U.S. Application Data

(60) Provisional application No. 61/249,745, filed on Oct. 8, 2009.

(51) Int. Cl.
 *H03K 5/00*    (2006.01)
 *H02P 6/00*    (2006.01)

(52) U.S. Cl. .......... 318/400.13; 318/400.1; 318/400.32; 318/400.35; 318/400.38; 318/599; 318/606; 318/811

(58) Field of Classification Search ........... 318/400.1, 318/400.13, 400.32, 400.35, 400.38, 599, 318/606, 811
See application file for complete search history.

(56) References Cited

U.S. PATENT DOCUMENTS

| 4,002,958 A * | 1/1977 | Akamatsu .................. 323/271 |
| 6,121,736 A * | 9/2000 | Narazaki et al. ......... 318/400.35 |
| 6,724,166 B2 * | 4/2004 | Narumi et al. ........... 318/400.23 |
| 2009/0049463 A1 | 2/2009 | Ueda ......................... 720/695 |

FOREIGN PATENT DOCUMENTS

| EP | 1478086 A2 | 11/2004 |
| EP | 1701437 A2 | 9/2006 |
| JP | 10334581 | 12/1998 |

OTHER PUBLICATIONS

Brown, Ward, "Brushless DC Motor Control Made Easy", Microchip Technology Inc., AN857, 48 pages, Sep. 12, 2002.
Yedamale, Padmaraja, "Brushless DC (BLDC) Motor Fundamentals", Microchip Technologies Inc., AN885, 20 pages, Nov. 11, 2003.
Lepkowski, Jim, "Motor Control Feedback Circuits", Microchip Technology Inc., AN894, 18 pages, Dec. 31, 2003.
Yedamale, Padmaraja, "Using the PIC18F2431 for Sensorless BLDC Motor Control", Microchip Technology Inc., AN970; 18 pages, Feb. 7, 2005.
International PCT Search Report, PCT/US2010/051469, 12 pages, Mar. 30, 2011.

* cited by examiner

*Primary Examiner* — Walter Benson
*Assistant Examiner* — Erick Glass
(74) *Attorney, Agent, or Firm* — King & Spalding L.L.P.

(57) ABSTRACT

Slow speed operation of a brushless DC (BLDC) motor is enhanced by gating off some of the PWM pulses in each commutation period. By doing so, longer PWM pulse widths may be used at PWM signal frequencies that are inaudible while still allowing desired slow speed operation of the BLDC motor. Centering the non-gated PWM pulses in each commutation period where peak back EMF occurs, further reduces losses and improves delivery of maximum torque from the BLDC motor.

17 Claims, 6 Drawing Sheets

SLOW SPEED OPERATION OF BRUSHLESS DIRECT CURRENT MOTORS BY GATING PULSE WIDTH MODULATION DRIVE

RELATED PATENT APPLICATION

This application claims priority to commonly owned U.S. Provisional Patent Application Ser. No. 61/249,745; filed Oct. 8, 2009; entitled "Slow Speed Operation of Brushless Direct Current Motors by Gating Pulse Width Modulation Drive," by Ward R. Brown; and is related to commonly owned U.S. patent application Ser. No. 12/767,101; filed Apr. 26, 2010; entitled "Variable Pulse Width Modulation for Reduced Zero-Crossing Granularity in Sensorless Brushless Direct Current Motors," by Ward R. Brown; and U.S. patent application Ser. No. 12/767,052; filed Apr. 26, 2010; entitled "Synchronized Minimum Frequency Pulse Width Modulation Drive for Sensorless Brushless Direct Current Motor," by Ward R. Brown; wherein all are hereby incorporated by reference herein for all purposes.

TECHNICAL FIELD

The present disclosure relates to brushless direct current (BLDC) motors, and more particularly, to slow speed operation of BLDC motors by gating pulse width modulation (PWM) drive.

BACKGROUND

Brushless direct current (BLDC) motors are used in industries such as appliances, automotive, aerospace, consumer, medical, industrial automation equipment and instrumentation. BLDC motors do not use brushes for commutation, instead, electronic commutation is used. BLDC motors have advantages over brushed DC motors and induction motors such as: better speed versus torque characteristics, high dynamic response, high efficiency, long operating life, longer time intervals between service, substantially noiseless operation, and higher speed ranges. More detailed information on BLDC motors may be found in Microchip Application Notes: AN857, entitled "Brushless DC Motor Control Made Easy," (2002); AN885, entitled "Brushless DC (BLDC) Motor Fundamentals," (2003); AN894, entitled "Motor Control Sensor Feedback Circuits," (2003); AN901, entitled "Using the dsPIC30 F for Sensorless BLDC Control," (2004); and AN970, entitled "Using the PIC18F2431 for Sensorless BLDC Motor Control," (2005); all are hereby incorporated by reference herein for all purposes.

A three-phase BLDC motor completes an electrical cycle, i.e., 360 electrical degrees of rotation, in six steps at 60 electrical degrees per step. Synchronously at every 60 electrical degrees, phase current switching is updated (commutation). However, one electrical cycle may not correspond to one mechanical revolution (360 mechanical degrees) of the motor rotor. The number of electrical cycles to be repeated to complete one mechanical revolution depends upon the number of rotor pole pairs. For example, a four-pole BLDC motor will require two electrical cycles to complete one mechanical revolution of the motor rotor (see FIG. 5).

Drive commutation for a BLDC motor may be determined by position sensors that monitor the rotational position of the motor rotor shaft. Such position sensors may be, for example but are not limited to, Hall Effect position sensors embedded into the stator on the non-driving end of the motor.

Drive commutation for a sensorless BLDC motor may also be determined by monitoring the back electromotive force (EMF) voltages at each phase (A-B-C) of the motor. The drive commutation is synchronized with the motor when the back EMF of the un-driven phase crosses one-half of the motor supply voltage during a commutation period. This is referred to as "zero-crossing" where the back EMF is equal to one-half of the motor supply voltage, over each electrical cycle. Zero-crossing is detected on the un-driven phase when the drive voltage is being applied to the driven phases. A voltage polarity change about the zero-crossing voltage of the back EMF on the un-driven phase may also be used in detecting a zero-crossing event, e.g., from positive to negative or negative to positive during application of the drive voltage to the driven phases within certain limits.

The rotational speed of a BLDC motor is dependent upon the amplitude of the average DC voltages applied to the stator windings of the motor. The higher the average DC voltage applied the faster will the BLDC motor rotate. Generally, DC voltages are generated using pulse width modulation (PWM) to control the voltage amplitudes applied to the stator windings. The PWM maximum frequency is limited by the switching losses of the drive transistors. The PWM minimum frequency is limited by the undesirable audio emissions at frequencies in the audio range. An acceptable compromise is in the 15 KHz to 20 KHz range. PWM duty cycle can only be reduced to the point where the drive pulse width can still propagate through the drive power field effect transistors (FETs) and low-pass filter characteristics inherent in all motor designs. Reducing the PWM frequency would allow longer drive periods but this would also introduce audible noise from the motor.

SUMMARY

The aforementioned problem is solved, and other and further benefits achieved by driving the brushless DC motor during a partial commutation period. The average drive voltage to the motor can be reduced further than available from the minimum pulse width and still maintain an inaudible PWM frequency by reducing the number of pulses in each commutation period. Therefore, average drive voltage to a BLDC motor can be further reduced by limiting the number of PWM pulses in each commutation period while maintaining an inaudible PWM signal period and duty cycle.

According to a specific example embodiment of this disclosure, a method for controlling low speed operation of a brushless direct current motor comprises the steps of: generating a plurality of pulse width modulation (PWM) pulses at a certain duty cycle; determining electrical timing centers for each of a plurality of commutation periods of a brushless direct current motor; gating off some of the plurality of PWM pulses in each of the plurality of commutation periods, wherein the plurality of PWM pulses not gated off are grouped toward the electrical timing centers of the plurality of commutation periods; and driving power switching transistors with the plurality of PWM pulses not gated off during the plurality of commutation periods, wherein the power switching transistors are connected between the stator coils of the brushless direct current motor and a direct current power source.

According to another specific example embodiment of this disclosure, a method for controlling low speed operation of a sensorless brushless direct current motor, said method comprising the steps of: generating a plurality of pulse width modulation (PWM) pulses at a certain duty cycle; determining electrical timing centers for each of a plurality of commutation periods of a brushless direct current motor by measuring back electromotive force voltages at each stator coil of the sensorless brushless direct current motor, and determining from the measured back electromotive force voltages when each of the measured back electromotive force voltages is at substantially a zero-crossing voltage value, wherein the zero-crossing voltage value is about one-half of a voltage value of a direct current power source; gating off some of the plurality of PWM pulses in each of the plurality of commutation periods, wherein the plurality of PWM pulses not gated off are grouped toward the electrical timing centers of the plurality commutation periods; and driving power switching transistors with the plurality of PWM pulses not gated off during the plurality commutation periods, wherein the power switching transistors are connected between the stator coils of the sensorless brushless direct current motor and the direct current power source.

BRIEF DESCRIPTION OF THE DRAWINGS

A more complete understanding of the present disclosure thereof may be acquired by referring to the following description taken in conjunction with the accompanying drawings wherein.

Figure 1:
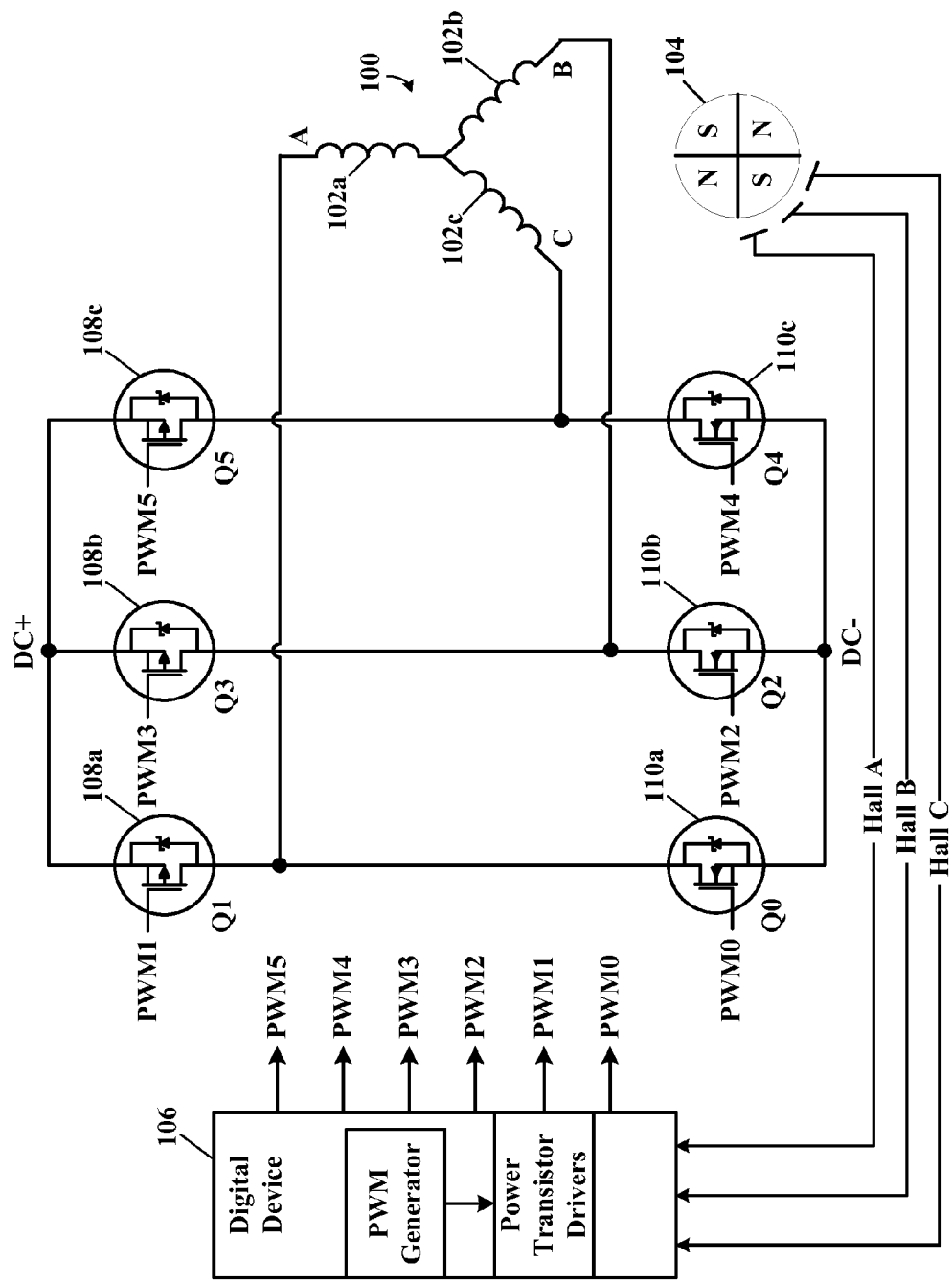
FIG. 1 illustrates a schematic diagram of a three-phase brushless direct current motor, Hall Effect position sensors and electronically commutating motor controller, according to a specific example embodiment of this disclosure.

While the present disclosure is susceptible to various modifications and alternative forms, specific example embodiments thereof have been shown in the drawings and are herein described in detail. It should be understood, however, that the description herein of specific example embodiments is not intended to limit the disclosure to the particular forms disclosed herein, but on the contrary, this disclosure is to cover all modifications and equivalents as defined by the appended claims.

DETAILED DESCRIPTION

Referring now to the drawing, the details of specific example embodiments are schematically illustrated. Like elements in the drawings will be represented by like numbers, and similar elements will be represented by like numbers with a different lower case letter suffix.

Referring to FIG. 1, depicted is a schematic diagram of a three-phase brushless direct current motor, Hall Effect position sensors and electronically commutating motor controller, according to a specific example embodiment of this disclosure. A three-phase brushless direct current motor, generally represented by the numeral 100, comprises a plurality of stator coils 102 and a rotor (not shown) having magnets arranged in a three-phase configuration. For discussion purposes the motor 100 described herein will be in a two pole three-phase configuration requiring 360 degrees of electrical rotation to produce one mechanical revolution of 360 degrees. The motor 100 is electronically commutated with power switching transistors 108 and 110 connected to the three-phase brushless direct current motor 100 and a direct current (DC) power source. The Hall Effect position sensors 104 supply rotor position information to a digital device 106 that may comprise a microcontroller (not shown), PWM generators having outputs coupled to power transistor drivers providing pulse width modulation (PWM) control outputs (PWM0-PWM5) that are used to control turn-on and turn-off of the power switching transistors 108 and 110. Based upon the combination of the three signals from the Hall Effect sensors 104, the exact sequence of commutation can be determined. Use of Hall Effect position sensors 104 for rotor position indication is preferable and may even be required in low speed motor applications.

The motor 100 is electronically commutated from a direct current (DC) source (not shown) through the power switching power transistors 108 and 110, e.g., power field effect transistors (one pair per phase for a three-phase motor). The power transistors 108 and 110 are controlled by the digital device 106, e.g., a microcontroller, that is coupled to the power transistors 108 and 110 through drivers for the power transistors (not shown). The digital device 106 provides six pulse width modulation (PWM) outputs, PWM0-PWM5, that control both the motor rotation direction and speed by turning on and off selected phase pairs of the power transistors 108 and 110 according to PWM signals appropriately sequenced and timed.

Figure 2:
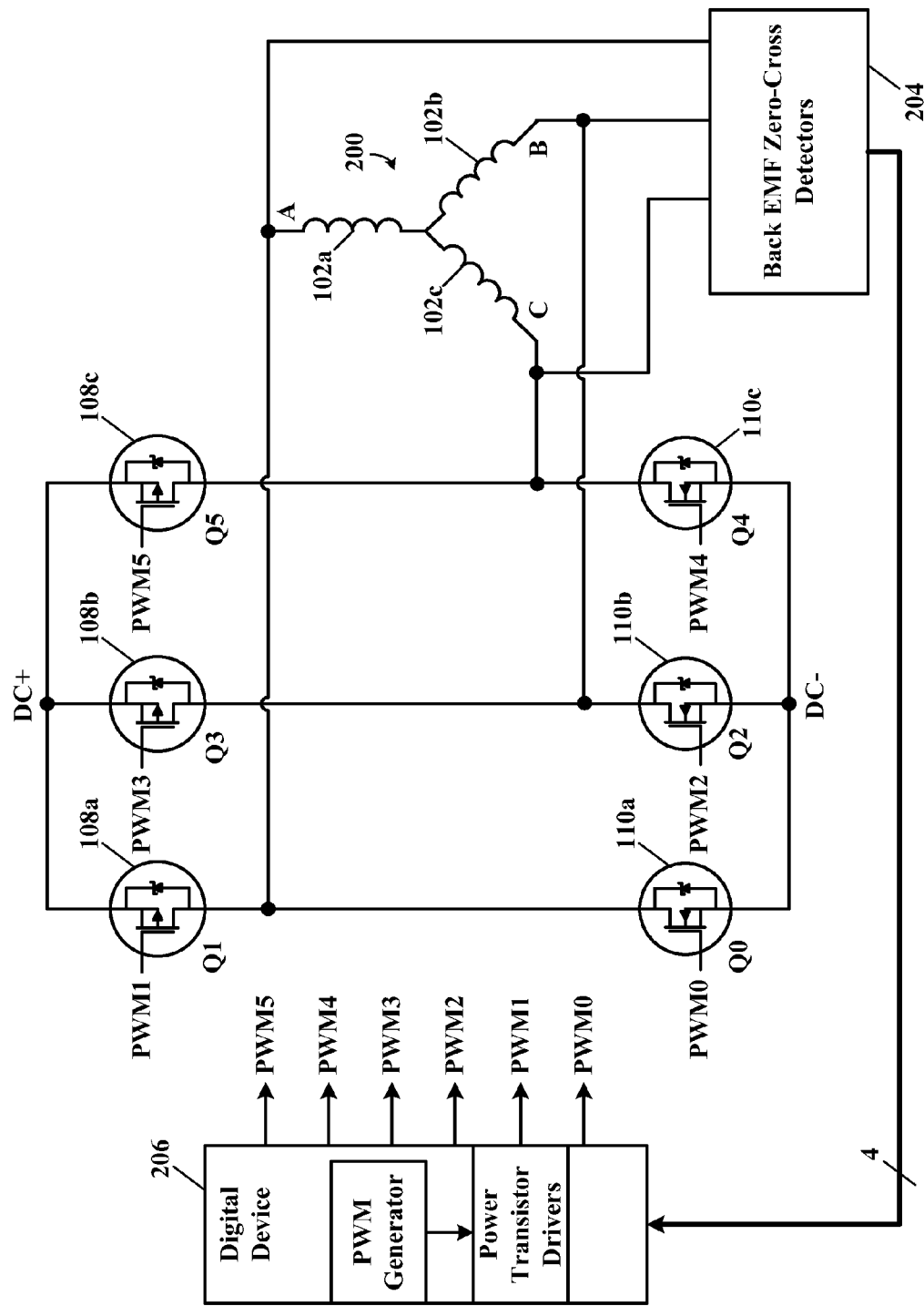
FIG. 2 illustrates a schematic diagram of a three-phase sensorless brushless direct current motor and electronically commutating motor controller, according to another specific example embodiment of this disclosure.

Referring to FIG. 2, depicted is a schematic diagram of a three-phase sensorless brushless direct current motor and electronically commutating motor controller, according to another specific example embodiment of this disclosure. A three-phase sensorless brushless direct current motor, generally represented by the numeral 200, comprises a plurality of stator coils 102 and a rotor (not shown) having magnets arranged in a three-phase configuration. For discussion purposes the motor 200 described herein will be in a two pole three-phase configuration requiring 360 degrees of electrical rotation to produce one mechanical revolution of 360 degrees. The motor 200 is electronically commutated with power switching transistors 108 and 110 connected to the three-phase sensorless brushless direct current motor 200 and a direct current (DC) power source. Back electromotive force (EMF) zero-cross detectors 204, a digital device 206, e.g., a microcontroller, having PWM generators that provide pulse width modulation (PWM) outputs coupled to power transistor drivers. The power transistor drivers (PWM0-PWM5) control turn-on and turn-off of the power switching transistors 108 and 110.

Each stator coil 102 is connected to the positive of the DC power source for two commutation periods, the negative of the DC power source for two commutation periods, and is disconnected from both the positive and negative of the DC power source for two commutation periods. The motor phase position is determined by back electromotive force (EMF) voltages measured at a stator coil 102 when not connected to the DC power source at the time of measurement while the other two stator coils 102 are connected to the DC power source. The back EMF voltages at each of the stator coils 102 are monitored by the back EMF zero-cross detectors 204 (one per phase). However, the back EMF voltage to be measured requires connection to the positive of the DC power source of one of the stator coils 102 so as to enable current flow therethrough, thereby biasing the motor generated voltage to a level centered around the detection reference level ("zero-crossing" event), e.g., one-half the supply voltage. The other stator coil 102 of the pair of coils having current flow therethrough is connected to the negative of the DC power source.

Figure 3:
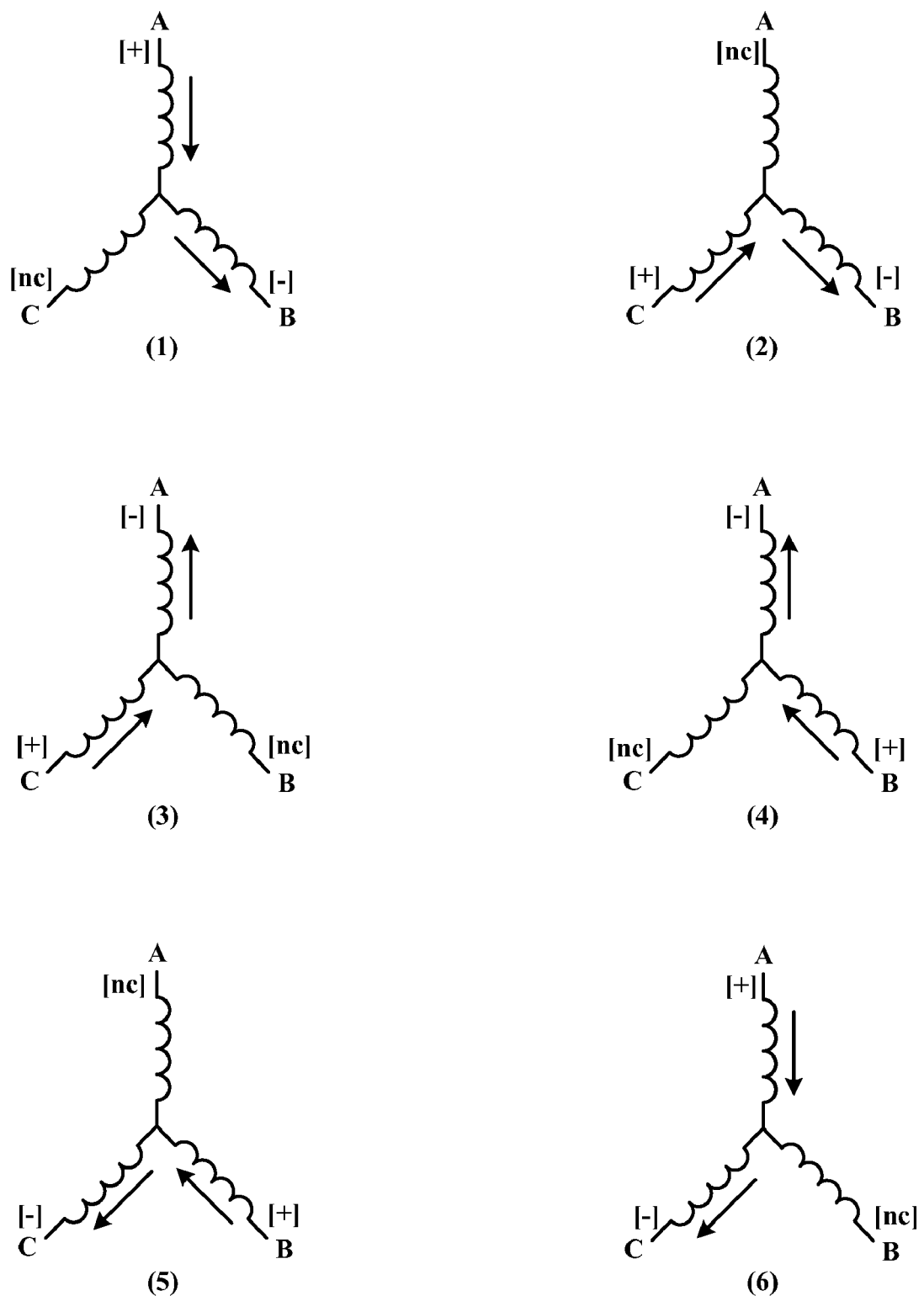
FIG. 3 illustrates schematic diagrams showing current flows in each of the three stator windings of a three-phase brushless direct current motor during each 60 degree commutation period.

Referring to FIG. 3, depicted are schematic diagrams showing current flows in each of the three stator windings (coils 102) of a three-phase brushless direct current motor during each 60 degree commutation period. Rotation of the motor 100 is divided into six commutation periods (1) through (6), and current flows through different combinations of two of the three coils 102 during each of the six commutation periods. While combinations of two of the coils 102 are connected to the DC power source, a third coil 102 (three-phase motor) is not connected to the power source. However the unconnected coil 102 is monitored by the back EMF zero-cross detectors 204 such that upon detection of a "zero crossing" event, i.e., back EMF voltage on the unconnected coil 102 changes polarity while going through a substantially zero voltage ("zero voltage" is defined herein as one-half of the DC supply voltage). At approximately the zero voltage point detected by a respective one of the back EMF zero-cross detectors 204, a synchronization relationship of the motor 200 stator coils 102 is ascertained, as more fully described hereinbelow. When Hall Effect position sensors 104 are used, back EMF zero-cross detection is not necessary as the Hall Effect position sensors 104 directly transmit the rotor position to the digital device 106.

Figure 4:
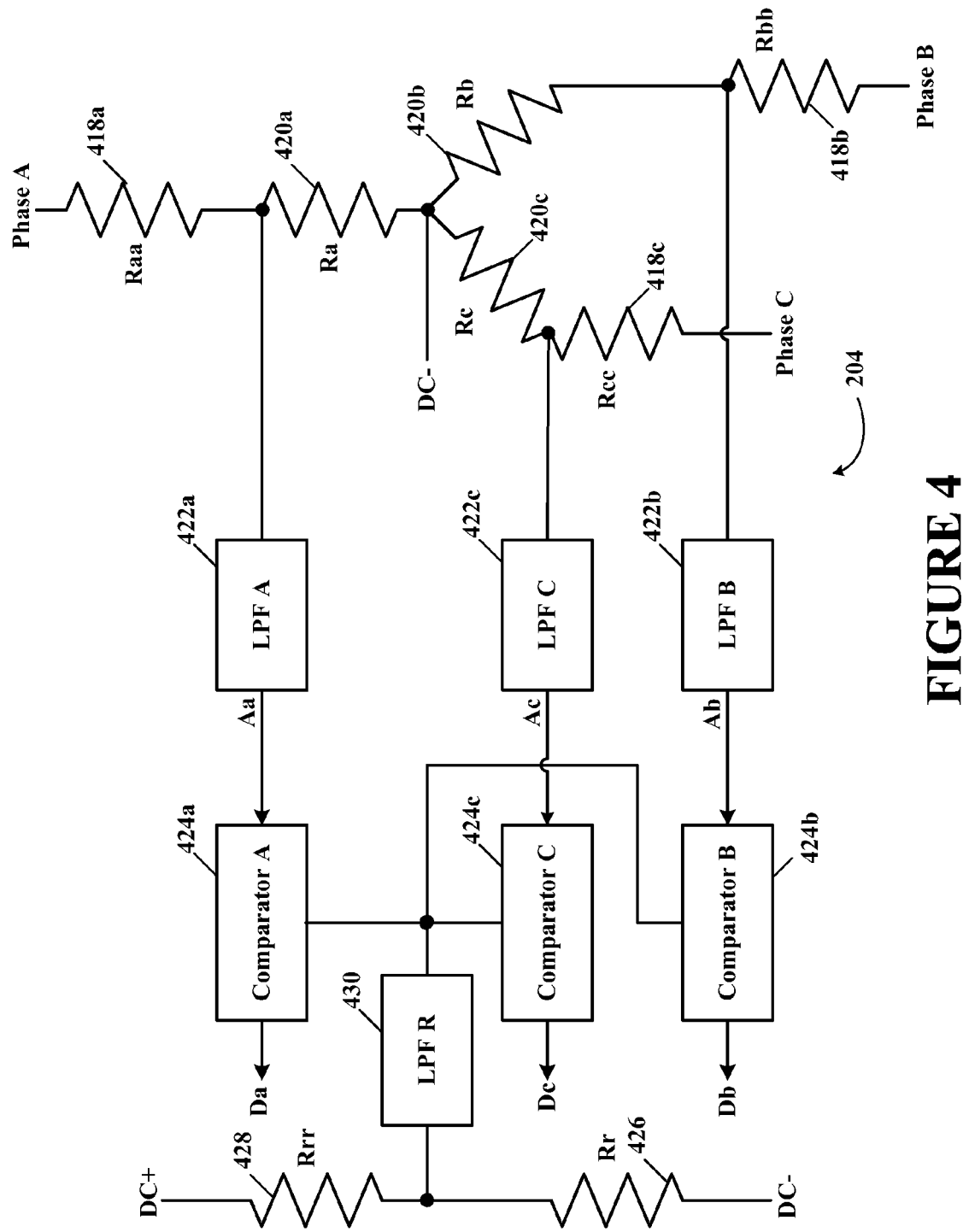
FIG. 4 illustrates a more detailed schematic diagram of the back EMF zero-cross detectors shown in FIG. 2.

Referring to FIG. 4, depicted is a more detailed schematic block diagram of the back EMF zero-cross detectors shown in FIG. 2. The back EMF zero-cross detectors 204 may comprise three-phase voltage divider resistors 418 and 420, phase low-pass filters 422, reference low-pass filter 430, reference voltage divider resistors 426 and 428, and voltage comparators 424. The reference voltage divider resistors 426 and 428 are used to derive a "virtual" neutral reference voltage for use by the comparators 424 and/or the digital device 206 having analog inputs. The three-phase voltage divider resistors 418 and 420 reduce the stator coils 102 voltages to much lower voltages for use by the low-pass filters 422 and comparators 424. Preferred resistance relationships for the resistors 418, 420, 426 and 428 are as follows:

$$Raa=Rbb=Rcc=Rrr$$

$$Ra=Rb=Rc=2*Rr$$

$$Ra/(Raa+Ra)=Vcomparator\_maximum\_input/DC+)-(DC-))$$

The low pass filters 422 may be used to substantially reduce unwanted noise from the inputs to the comparators 424. The comparators 424 are used in determining when a back EMF voltage on an unconnected coil 102 is greater than the neutral reference voltage, or less than or equal to the neutral reference voltage. The outputs of the comparators 424 when at a logic high ("1") may represent that the back EMF voltage is greater than the neutral reference voltage, and when at a logic low ("0") may represent that the back EMF voltage is less than or equal to the neutral reference voltage, or visa-versa (designer's choice). The outputs of each of the comparators 424 may thereby be used to indicate when the back EMF voltage is at its "zero" transition point or when a back EMF polarity transition occurs, and indicate same to the digital device 206. If the digital device has analog inputs and analog-to-digital (ADC) conversion capabilities and/or voltage comparators, the external comparators may not be required. When this is the case, the outputs from the low pass filters and the neutral reference voltage from the resistors 426 and 428 may be connected directly to the analog inputs (not shown) of the digital device 206 (e.g., mixed signal device).

Figure 5:
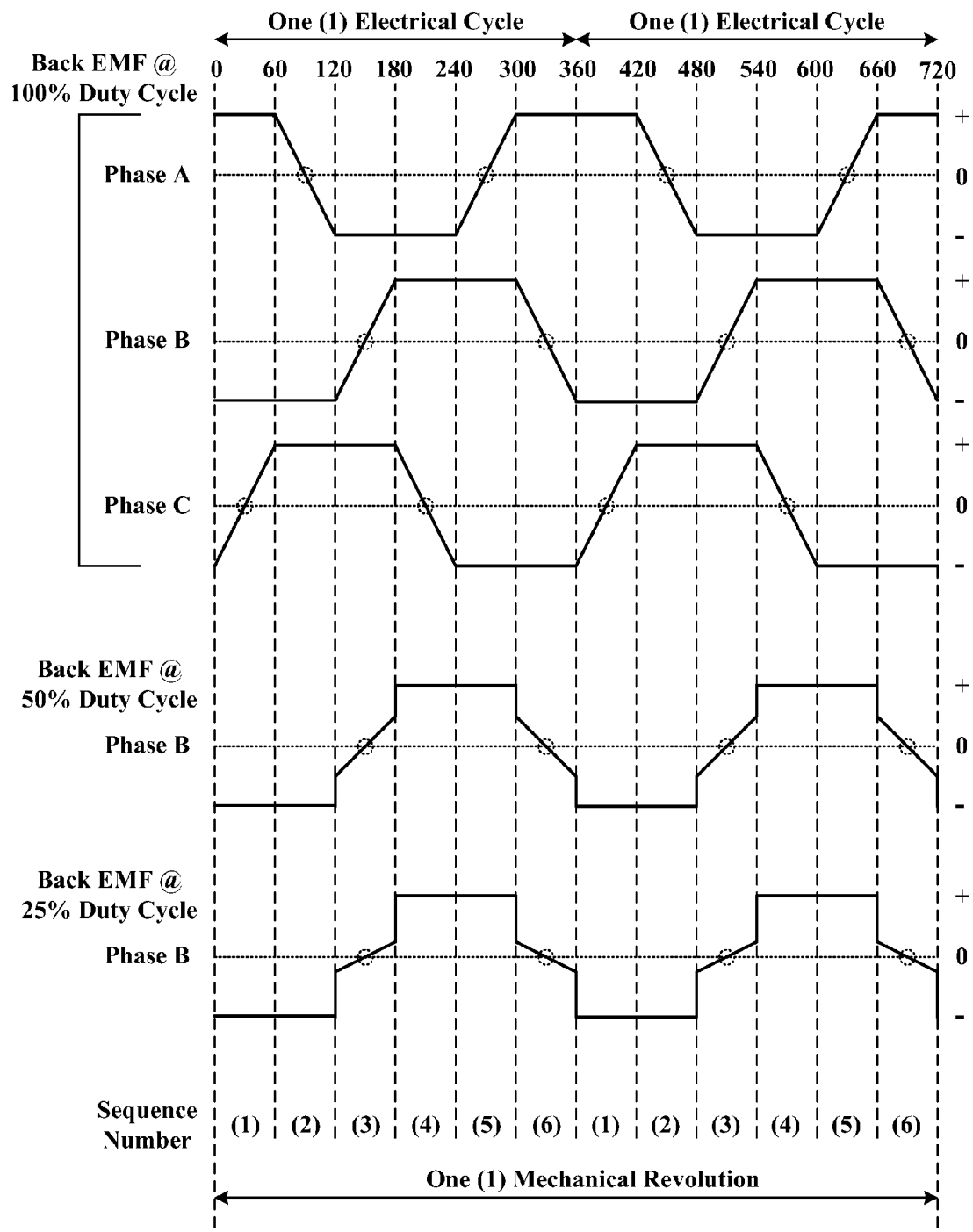
FIG. 5 illustrates schematic timing and amplitude graphs of a four-pole motor showing back electromotive force (EMF) voltages at each of the three stator windings during each 60 degree commutation period.

Referring to FIG. 5, depicted are schematic timing and amplitude graphs of a four-pole motor showing back electromotive force (EMF) voltages at each of the three stator windings during each 60 degree commutation period. When a phase coil is not connected to the DC power source no current flows therethrough. When a phase coil is connected to the positive (DC+) power source, current flows in a positive direction for two commutation periods (120 electrical degrees), then no current flows (coil is unconnected from the DC power source) for a subsequent commutation period (60 electrical degrees), and after the unconnected commutation period the very same coil has current flow in a negative direction for two commutation periods (120 electrical degrees) when connected to the negative (DC−) power source, and then no current flows in a next commutation period (60 electrical degrees) before the aforementioned electrical cycle repeats, i.e., for another 360 degree electrical cycle.

When using a sensorless BLDC motor, the back EMF voltage on the unconnected coil is transitioning from the positively driven polarity to the negatively driven polarity and does so throughout the 60 degree period when not being connected. If current is initially going into the coil when the connection is broken then the current will continue to flow thereby forward biasing a diode in parallel with the low-side drive transistor 110 presenting a voltage on the motor coil terminal equal to the negative (DC−) power source voltage plus the forward bias voltage of the diode. This negative spike persists until the energy in the coil is dissipated.

A "zero crossing" is where the measured voltage at each phase coil 102 goes to substantially one-half of the DC supply voltage (in the graphs normalized to "zero"), and is illustrated by the small circles of the back EMF graphs. When the PWM duty cycle is 100% in a commutation period, the measured back EMF varies between the full positive (DC+) rail voltage and the full negative (DC−) rail voltage of the power source. When the PWM duty cycle is 50% in a commutation period, the measured back EMF varies between 50% (one-half) of the full positive (DC+) rail voltage and 50% (one-half) of the full negative (DC−) rail voltage of the power source. When the PWM duty cycle is 25% in a commutation period, the measured back EMF varies between 25% (one-half) of the full positive (DC+) rail voltage and 25% (one-half) of the full negative (DC−) rail voltage of the power source. Therefore there is a direct correlation between the PWM duty cycle applied to the two current carrying coils 102 and the measured back EMF on the unconnected coil 102. However, the back EMF always passes through the "zero crossing" point at substantially the center (e.g., middle, half-way point) of a commutation period when the other two coils are excited (current flowing therethrough). Just at lower PWM duty cycles, there is less variation of the back EMF voltage in the commutation period. This is not problematic since the "zero crossing" point is what is of interest.

It is important to remember that back EMF on the unconnected coil 102 is biased properly for detection only when the other two coils 102 are connected to the positive (DC+) and negative (DC−) power source rails and current flows through them. If there is no current flow in the two connected coils 102 at the time when a "zero crossing" should occur then the back EMF voltage at the unconnected coil 102 will not be centered relative to the reference voltage, and detection of the exact "zero crossing" will not be possible. However, missing detection of the exact "zero crossing" point in time because power drive is off (no current flow) at the instant of exact zero crossing may not be fatal so long as a change in polarity, e.g., positive to negative or visa versa, of the back EMF is determined when the power drive returns soon after zero crossing, and that this occurs close enough in time (electrical degrees) so as not to cause too great of a commutation timing error in normal operation. Instability problems do result when low duty cycle PWM signals cause significant commutation timing errors. As illustrated in the back EMF graphs shown in FIG. 5, "zero crossing" points occur at approximately 30 electrical degrees from a commutation period change, i.e., substantially in the center (middle) of a commutation period. Use of Hall Effect position sensors 104 (FIG. 1) are preferable when low duty cycle PWM signals are used for low speed motor applications.

Figure 6:
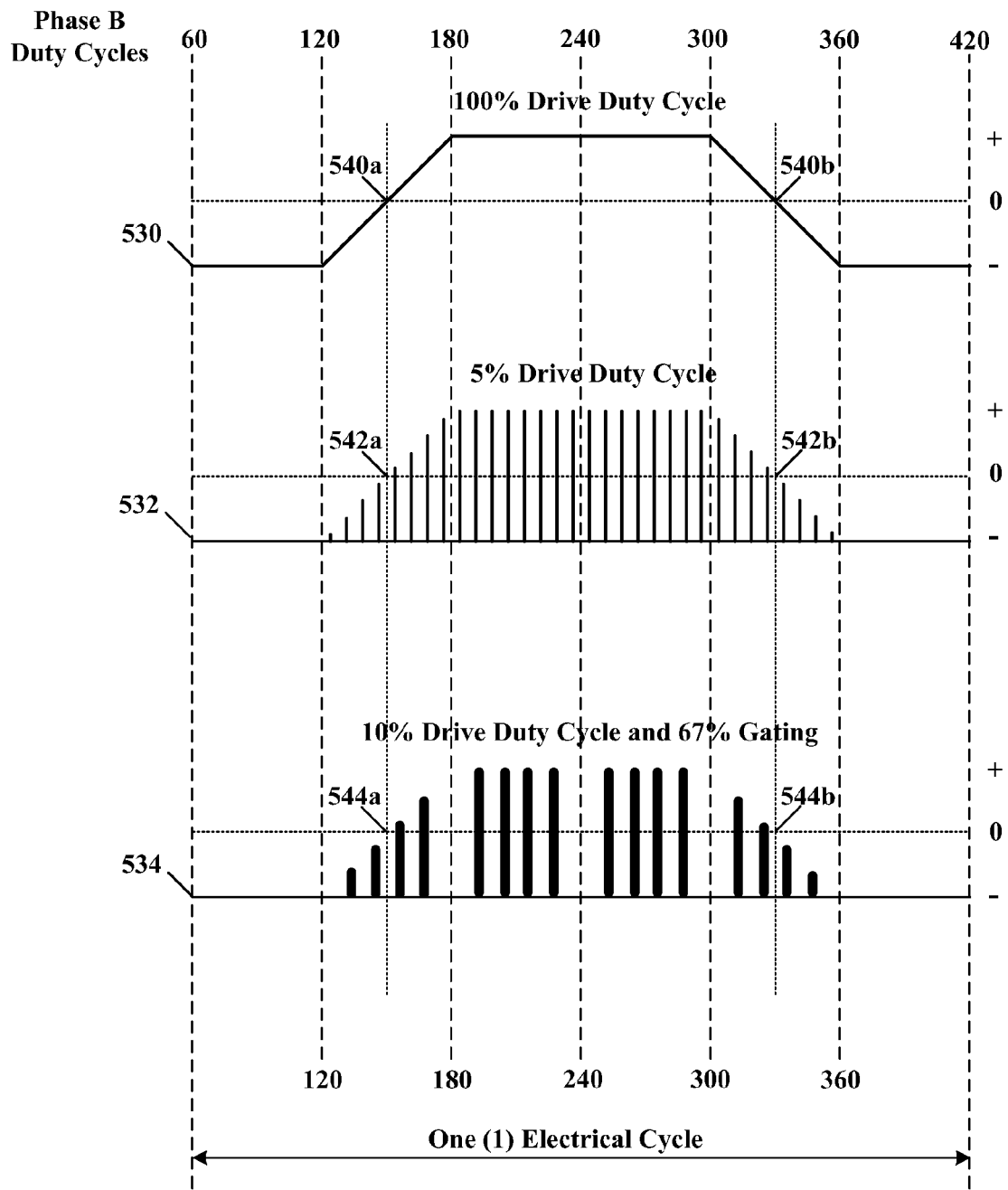
FIG. 6 illustrates schematic amplitude and timing graphs of voltages at one phase of the BLDC motor during each commutation period for different PWM duty cycles, according to the teachings of this disclosure.

Referring to FIG. 6, depicted are schematic amplitude and timing graphs of voltages at one phase of the sensorless BLDC motor during each commutation period for different PWM duty cycles, according to the teachings of this disclosure. The BLDC motor operates at rotational speeds that are dependent upon the average voltages on each stator coil 102 during appropriate 60 degree commutation periods. Direction of rotation of the motor 100 (200) is dependent upon the commutation connection order of the coils 102 to the DC power source over each (360 degree) electrical cycle.

Graph 530 represents a 100 percent PWM drive duty cycle over one electrical cycle at one phase of the motor 100. The 100 percent duty cycle will result in maximum voltages resulting in maximum rotational speed of the motor 100.

Graph 532 represents approximately a five (5) percent PWM drive duty cycle over one electrical cycle at one phase of the motor 100 or 200. At low PWM duty cycles, less average voltages will be created and thus slower rotational speeds will result since motor speed is directly proportional to the applied voltage. The ratio of rotational speed to applied voltage is much higher in high speed motors than that of low speed motors. Therefore, relatively small applied voltages in high speed motors will still result in significantly fast speed. Reducing the voltage by PWM is limited by the drive transistors 108 and 110 and the electrical characteristics of the motor since the PWM duty cycle can only be reduced to the point where the drive pulse widths can still propagate through the low pass frequency characteristics inherent in all motor designs. PWM signals whose pulse widths are too short are either attenuated by the low-pass characteristics of the motor and/or are shorter than the switching times of the drive power transistors 108 and 110. Reducing the PWM frequency to enable use of longer pulse widths creates audible noise disturbances from the motor. Thus, the minimum inaudible PWM frequency determines the maximum pulse widths that can be used for slow speed operation of the motor 100 or 200.

Graph 534 represents approximately a ten (10) percent PWM drive duty cycle over one electrical cycle at one phase of the motor 100 or 200. At lower duty cycles of the PWM signal, less average voltages will be created and thus slower rotational speeds will result. However, the average drive voltage to the motor can be reduced further than is possible with the minimum inaudible PWM frequency (shown in graph 532) by reducing the number of PWM pulses in each commutation period. This may be accomplished by gating off some of the PWM pulses that would normally be generated, as shown in graph 532. This allows the average drive voltage to the BLDC motor 100 or 200 to be reduced by limiting the number of PWM pulses while maintaining the PWM period and duty cycle. The use of longer PWM pulse widths (e.g., 10%) are more compatible with the motor 100 or 200 and the driver transistors 108 and 110 characteristics. Use of fewer PWM pulses in a commutation period allows lower average drive voltages (slower rotational speeds). Preferably, the PWM drive pulses may be centered on the peak back EMF in the commutation periods to keep the current-resistance (I-R) losses at a minimum and to deliver maximum torque.

Note that since the PWM pulses are substantially centered within each of the commutation periods, e.g., at +/−, 30, 90, 150, 210, 270, 330 degrees (electrical timing centers). The exact electrical timing center for each of the commutation periods may be shifted slightly +/− from the +30 degree values depending upon inductive lag and motor characteristics. Commutation period timing relationships are preferably determined using the rotor position signals from the Hall Effect position sensors 104 to the digital device 106 when operating at low rotational speeds. However, since the PWM signal pulses during each commutation period are substantially centered therein, there will be back EMF excitation voltage in an unconnected coil 102 near a "zero-crossing" (e.g., near points 544). Therefore, even during low PWM drive duty cycles where the off times of the PWM pulses in each commutation period are significant, a "zero-crossing" (points 544) may be determined when the measured back EMF changes polarity (referenced to the neutral reference voltage shown in FIG. 4).

While embodiments of this disclosure have been depicted, described, and are defined by reference to example embodiments of the disclosure, such references do not imply a limitation on the disclosure, and no such limitation is to be inferred. The subject matter disclosed is capable of considerable modification, alteration, and equivalents in form and function, as will occur to those ordinarily skilled in the pertinent art and having the benefit of this disclosure. The depicted and described embodiments of this disclosure are examples only, and are not exhaustive of the scope of the disclosure.

What is claimed is:

1. A method for controlling low speed operation of a brushless direct current motor, said method comprising the steps of:
   generating a plurality of pulse width modulation (PWM) pulses at a certain duty cycle;
   determining electrical timing centers for each of a plurality of commutation periods of a brushless direct current motor;
   gating off some of the plurality of PWM pulses in each of the plurality of commutation periods, wherein the plurality of PWM pulses not gated off are grouped toward the electrical timing centers of the plurality of commutation periods; and
   driving power switching transistors with the plurality of PWM pulses not gated off during the plurality of commutation periods, wherein the power switching transistors are connected between the stator coils of the brushless direct current motor and a direct current power source.

2. The method according to claim 1, wherein the step of determining electrical timing centers for each of a plurality of commutation periods comprises the step of measuring rotor positions of the brushless direct current motor.

3. The method according to claim 2, wherein the step of measuring rotor positions is performed with Hall Effect position sensors.

4. The method according to claim 1, wherein the brushless direct current motor is a sensorless brushless direct current motor.

5. The method according to claim 4, wherein the step of determining electrical timing centers of the plurality of commutation periods comprises the steps of:
- measuring back electromotive force voltages at each stator coil of the sensorless brushless direct current motor; and
- determining from the measured back electromotive force voltages when they are at substantially a zero-crossing voltage value which is about one-half of a voltage value of the direct current power source.

6. The method according to claim 1, wherein the brushless direct current motor is a three-phase motor and has six commutation periods in an electrical cycle.

7. The method according to claim 6, wherein each of the commutation periods is 60 degrees in the electrical cycle and the electrical cycle is 360 degrees.

8. The method according to claim 1, wherein the certain duty cycle has off-times greater than on-times of the plurality of pulses.

9. The method according to claim 1, wherein the certain duty cycle on-times are less than or equal to fifty percent of off-times of the plurality of PWM pulses.

10. The method according to claim 1, wherein the certain duty cycle on-times are less than or equal to ten percent of off-times of the plurality of PWM pulses.

11. A method for controlling low speed operation of a sensorless brushless direct current motor, said method comprising the steps of:
- generating a plurality of pulse width modulation (PWM) pulses at a certain duty cycle;
- determining electrical timing centers for each of a plurality of commutation periods of a sensorless brushless direct current motor by
  - measuring back electromotive force voltages at each stator coil of the sensorless brushless direct current motor, and
  - determining from the measured back electromotive force voltages when each of the measured back electromotive force voltages is at substantially a zero-crossing voltage value, wherein the zero-crossing voltage value is about one-half of a voltage value of a direct current power source;
- gating off some of the plurality of PWM pulses in each of the plurality of commutation periods, wherein the plurality of PWM pulses not gated off are grouped toward the electrical timing centers of the plurality commutation periods; and
- driving power switching transistors with the plurality of PWM pulses not gated off during the plurality commutation periods, wherein the power switching transistors are connected between the stator coils of the sensorless brushless direct current motor and the direct current power source.

12. The method according to claim 11, wherein the sensorless brushless direct current motor is a three-phase sensorless brushless direct current motor and has six commutation periods in an electrical cycle.

13. The method according to claim 12, wherein each of the commutation periods is 60 degrees in the electrical cycle and the electrical cycle is 360 degrees.

14. The method according to claim 12, wherein the step of determining electrical timing centers comprises the steps of:
- applying the direct current power source to two stator coils of the three-phase sensorless brushless direct current motor; and
- measuring the back electromotive force voltage at a third stator coil of the three-phase sensorless brushless direct current motor while not connected to the direct current power source.

15. The method according to claim 11, wherein the certain duty cycle has off-times greater than on-times of the plurality of pulses.

16. The method according to claim 11, wherein the certain duty cycle on-times are less than or equal to fifty percent of off-times of the plurality of PWM pulses.

17. The method according to claim 11, wherein the certain duty cycle on-times are less than or equal to ten percent of off-times of the plurality of PWM pulses.

* * * * *